US005548575A

United States Patent [19]
Okada et al.

[11] Patent Number: 5,548,575
[45] Date of Patent: Aug. 20, 1996

[54] TRANSVERSE CONTROL DEVICE FOR OPTICAL HEAD HAVING A PULSE-DRIVEN COARSE POSITIONING ACTUATOR AND A PRECISION ACTUATOR

[75] Inventors: Tsuyoshi Okada, Yokosuka; Kazuo Shibuya, Yokohama, both of Japan

[73] Assignee: Matsushita Electric Industrial Co., Ltd., Osaka, Japan

[21] Appl. No.: 302,393

[22] Filed: Sep. 8, 1994

Related U.S. Application Data

[63] Continuation of Ser. No. 998,689, Dec. 30, 1992, abandoned.

[30] Foreign Application Priority Data

Jan. 10, 1992 [JP] Japan .................................. 4-002689

[51] Int. Cl.⁶ .................................................. G11B 17/30
[52] U.S. Cl. ........................................................... 369/219
[58] Field of Search ........................................ 369/215, 219, 369/230, 224, 225, 32, 33, 44.11, 44.32; 359/811, 830

[56] References Cited

U.S. PATENT DOCUMENTS

| | | | |
|---|---|---|---|
| 4,835,752 | 5/1989 | Nakatsu et al. | 369/215 |
| 4,866,687 | 9/1989 | Kasai et al. | 369/33 |
| 5,088,075 | 2/1992 | Yokota | 369/33 |
| 5,130,964 | 7/1992 | Ito | 369/32 |

FOREIGN PATENT DOCUMENTS

| | | |
|---|---|---|
| 61-1213819 | 9/1986 | Japan . |
| 215425 | 1/1990 | Japan . |

*Primary Examiner*—Stuart S. Levy
*Assistant Examiner*—Allen Cao
*Attorney, Agent, or Firm*—Watson, Cole, Stevens, Davis, P.L.L.C.

[57] ABSTRACT

The present invention aims at providing an optical head feed device capable of driving stably a coarse positioning actuator even in presence of fluctuation in static frictional force and/or load and reducing the position error of a precision positioning actuator with respect to the center of movement. The optical feed device is so configured that the low-frequency component of displacement of the tracking precision positioning actuator may be detected. Pulse generation means generates drive pulses for the coarse positioning actuator at predetermined time periods so that the output of the detected low-frequency component may come within a fixed range. If a fixed time has elapsed since a drive pulse was outputted and thereafter the low-frequency component of displacement of the precision positioning actuator does not change or the change value is small, the magnitude and time width of the drive pulse are changed and the drive pulse with the magnitude and time width thus changed, is outputted again.

2 Claims, 4 Drawing Sheets

TRANSVERSE CONTROL DEVICE FOR OPTICAL HEAD HAVING A PULSE-DRIVEN COARSE POSITIONING ACTUATOR AND A PRECISION ACTUATOR

This application is a continuation of application Ser. No. 07/998,689, filed Dec. 30, 1992 (abandoned).

BACKGROUND OF THE INVENTION

1. Field of the Invention

The present invention relates to an optical head feed device for recording and reproducing information onto/from a recording medium such as a CD (compact disk), an optical disk, or a photomagnetic disk.

2. Description of the Prior Art

In optical head feed devices, signal tracks on the recording medium are spiral and hence the optical head is moved in a transverse direction of tracks on the recording medium at the time of recording and reproducing on the recording medium.

An example of a conventional optical head feed device will hereafter be described by referring to drawing.

FIG. 1A is a schematic top view showing a conventional optical head feed device.

As shown in FIG. 1A, an objective lens 1 is supported above an optical section 2 by a precision positioning actuator 3 made of an elastic material so that the objective lens 1 may be positioned precisely in the radial direction (i.e., tracking direction) of a disk D. The objective lens 1 and the optical section 2 are moved in the radial direction of the disk D by a coarse positioning actuator 7 including a carriage 4, a screw 5 and a stepping motor 6. The objective lens 1 is thus positioned coarsely. The precision positioning actuator 3 and the stepping motor 6 for the coarse positioning actuator 7 are controlled by a controller 8.

An optical head feed operation in the configuration heretofore described will hereafter be described.

Laser light emitted from the optical section 2 is passed through the objective lens 1 and focused on the recording face of the disk D. Reflected light from the recording face of the disk D is passed through the objective lens 1 and led into the optical section 2 again. From the optical section 2, a signal indicating how much the objective lens 1 deviates in the radial direction from a signal track engraved on the recording face of the disk D, i.e., a tracking error signal is outputted. On the basis of the tracking error signal, the controller 8 generates outputs for driving the precision positioning actuator 3 and the coarse positioning actuator 7. The precision positioning actuator 3 moves the objective lens 1 so that it may accurately follow one of a plurality of signal tracks recorded with a pitch of 1.6 µm, for example, as in a compact disk. Since the range of movement of the precision positioning actuator 3 is narrow, the entire range of the disk D is covered by driving the coarse positioning actuator 7 to move the objective lens 1 and the precision positioning actuator 3 in the tracking direction.

A concrete control method for feeding the optical head will now be described by referring to FIG. 1B.

FIG. 1B is a block diagram showing a control system of a conventional optical head feed device.

In FIG. 1B, numeral 9 denotes a transfer function of a tracking system, 10 a low-pass filter, and 11 a lens position converting transfer function.

On the basis of the tracking error signal generated by the optical section 2 as described above, the tracking system transfer function 9 generates the drive output for the precision positioning actuator 3 after phase compensation. By using this drive output as input, the precision positioning actuator 3 moves the objective lens 1 so that it may follow the signal track even if the disk D is eccentric.

Since the signal tracks on the disk D are recorded spirally from an inner circumference to an outer circumference, the objective lens 1 following the signal tracks gradually deviates to an outer circumference. The deviation appears in the drive output for the precision positioning actuator 3 as a DC offset. Therefore, only a low-frequency component of the drive output for the precision positioning actuator 3 is taken out by the low-pass filter 10 and used to drive the coarse positioning actuator 7 to position the objective lens 1 nearly in the drive center of the precision positioning actuator 3. The lens position converting transfer function 11 is a transfer function for converting the displacement of the coarse positioning actuator 7 to a displacement of the objective lens 1. Eventually, the control system of this optical head feed device functions so that the error between the absolute displacement of the objective lens 1, which is determined by the displacements of the precision positioning actuator 3 and the coarse positioning actuator 7, and the signal track of the disk D may become 0.

By using the optical head feed device heretofore described, it becomes possible to make the objective lens 1 follow the signal tracks of the disk D over a wide range extending from an inner circumference to an outer circumference.

If there is a fluctuation in load and/or static frictional force of the coarse positioning actuator 7 for moving the whole including the precision positioning actuator 3, however, the coarse positioning actuator 7 in the above described conventional configuration does not begin to move until the low-frequency component of the drive output for the precision positioning actuator 3 becomes large. Therefore, the optical axis of the objective lens 1 might deviate from the signal track, resulting in degraded signal output. Further the actuator 7 might make a big movement resulting in moving the actuator 3 out of a controlled movable range limit of the actuator 3 and disabling the objective lens to track on or follow the signal track. Furthermore, since the control gain also fluctuates due to a fluctuation in load, stability becomes poor even if movement has been started. Furthermore, there is a risk of oscillation and runaway when the gain of the entire control system is increased to cope with a fluctuation in static frictional force.

SUMMARY OF THE INVENTION

The present invention aims at solving the above described problems of the conventional technique. An object of the present invention is to provide an optical head feed device capable of stably feeding an optical head with a reduced position error despite a fluctuation in static frictional force and/or load of the coarse positioning actuator.

In order to solve the above described problems, an optical head feed device according to the present invention includes a precision positioning actuator for precisely positioning an objective lens in a tracking direction, a coarse positioning actuator for moving the objective lens and the precision positioning actuator, and a coarse positioning actuator drive output means for detecting a low-frequency component of a displacement of the precision positioning actuator and generating drive pulses for the coarse positioning actuator at predetermined time periods so that the output of the detected low-frequency component may come within a fixed range.

If a fixed time has elapsed since the coarse positioning actuator drive output means outputted a drive pulse for the coarse positioning actuator and thereafter the low-frequency component of displacement of the precision positioning actuator does not change or the change value is small, the coarse positioning actuator drive output means preferably changes the magnitude and time width of the above described drive pulse and outputs the drive pulse again with the magnitude and time width thus changed.

Since the drive output for the coarse positioning actuator is given pulsatively by the above described configuration, the present invention provides comparatively high resistance to a fluctuation in static frictional force and/or load and a reduced position error of the precision positioning actuator with respect to the center of movement.

DESCRIPTION OF THE PREFERRED EMBODIMENTS

Figure 1A:
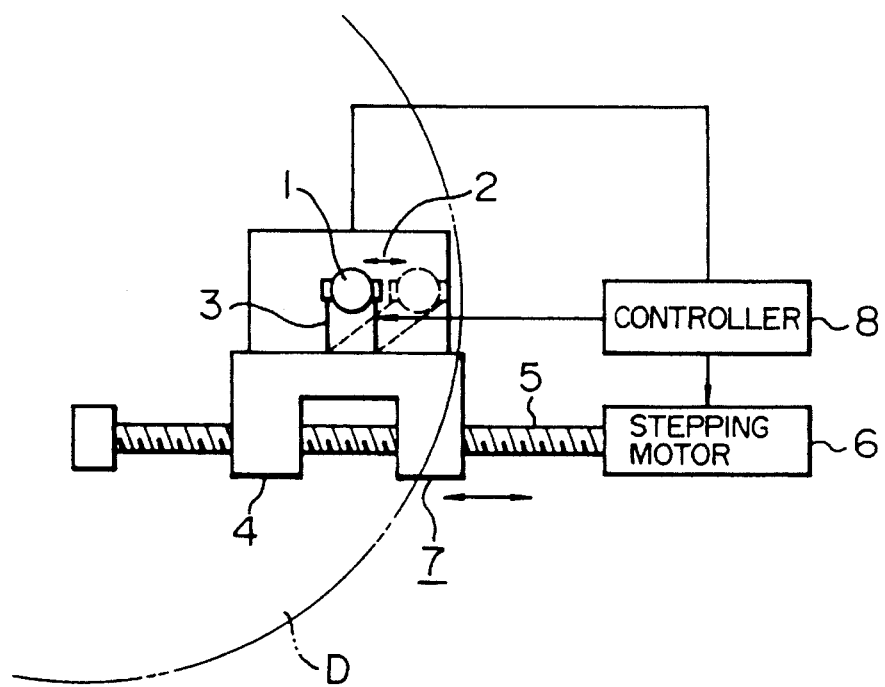
FIG. 1A is a schematic top view showing a conventional optical head feed device.
Figure 1B:
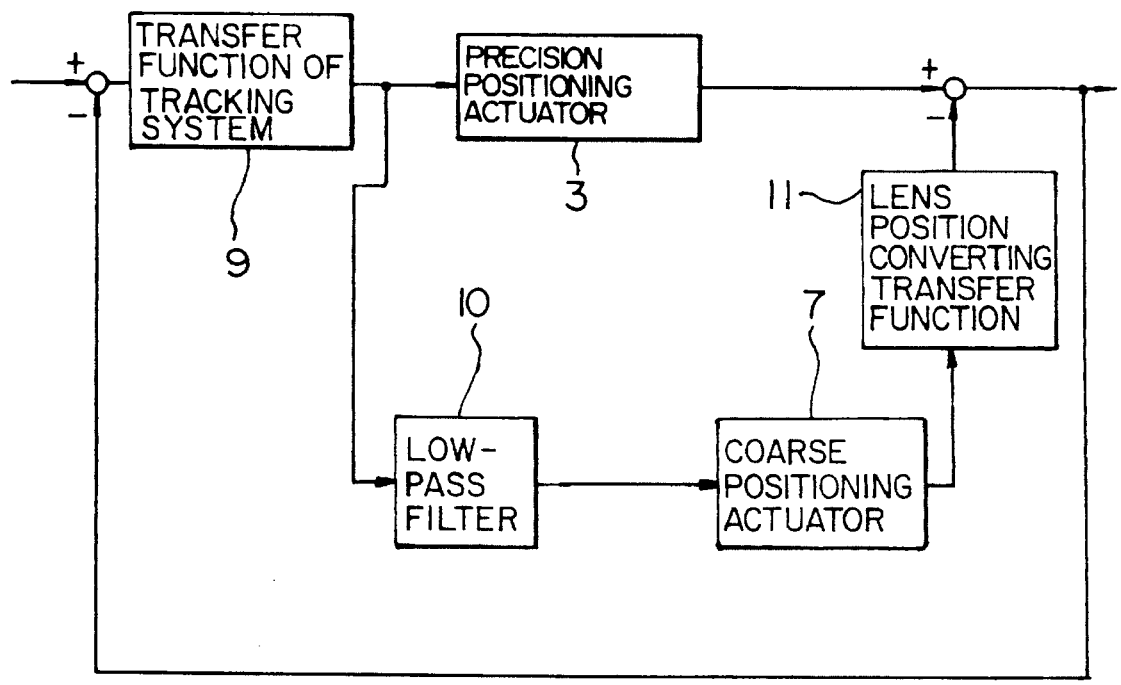
FIG. 1B is a schematic block diagram showing the conventional optical head feed device.

An embodiment of the present invention will hereafter be described by referring to the drawing.

Figure 2A:
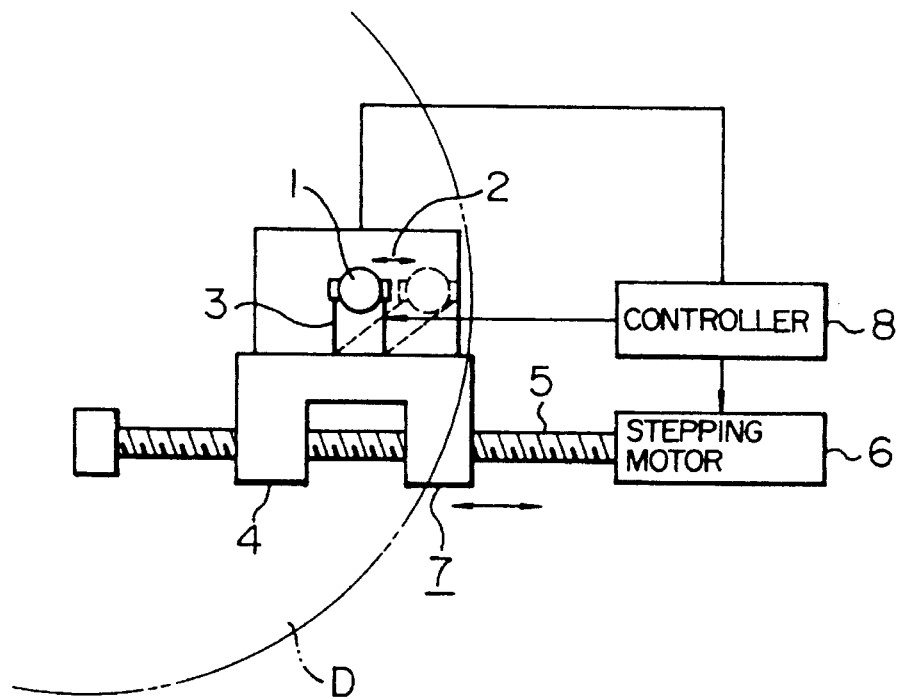
FIG. 2A is a schematic top view showing an optical head feed device according to an embodiment of the present invention.

FIG. 2A is a schematic top view showing an optical head feed device according to an embodiment of the present invention.

In FIG. 2A, numeral 1 denotes an objective lens, 2 an optical section, 3 a precision positioning actuator, and 7 a coarse positioning actuator. The coarse positioning actuator 7 includes a carriage 4, a screw 5 and a stepping motor 6. Numeral 8 denotes a controller. The configuration of them is identical with that of the above described conventional technique.

An optical head feed operation in the configuration heretofore described will hereafter be described.

In the same way as the conventional technique, laser light emitted from the optical section 2 is passed through the objective lens 1 and focused on the recording face of a disk D. Reflected light from the recording face of the disk D is passed through the objective lens 1 and led into the optical section 2 again. From the optical section 2, a signal indicating how much the objective lens 1 deviates in the radial direction from a signal track engraved on the recording face of the disk D, i.e., a tracking error signal is outputted. On the basis of the tracking error signal, the controller 8 generates outputs for driving the precision positioning actuator 3 and the coarse positioning actuator 7. The precision positioning actuator 3 moves the objective lens 1 so that it may accurately follow one of signal tracks recorded with a pitch of 1.6 μm, for example, as in a compact disk. Since the range of movement of the precision positioning actuator 3 is narrow, the entire range of the disk D is covered by driving the coarse positioning actuator 7 to move the objective lens 1 and the precision positioning actuator 3 in the tracking direction.

A concrete control method for feeding the optical head will now be described by referring to FIG. 2B.

Figure 2B:
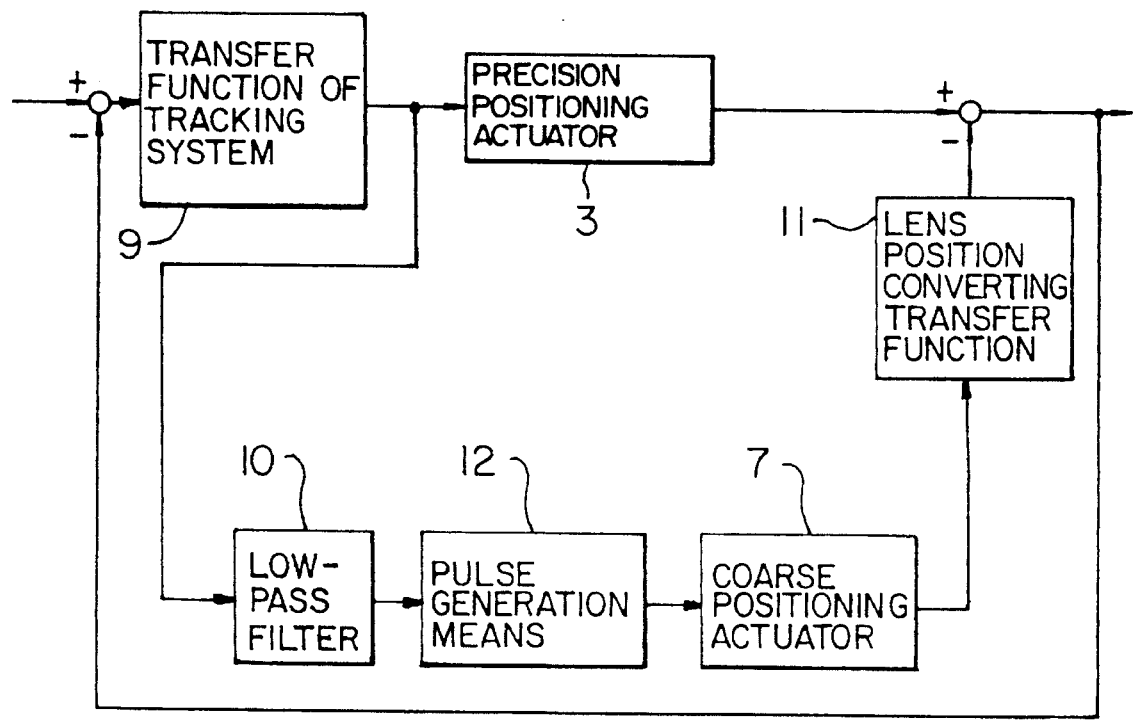
FIG. 2B is a schematic block diagram showing a control system of the optical head feed device shown in FIG. 2A.

FIG. 2B is a schematic block diagram showing a control system of an optical head feed device according to an embodiment of the present invention.

In FIG. 2B, numeral 9 denotes a transfer function of a tracking system, 10 a low-pass filter, and 11 a lens position converting transfer function. Configuration of these elements is identical with that of the above described conventional technique. In accordance with the present invention, pulse generation means 12 is provided between the low-pass filter 10 and the coarse positioning actuator 7.

On the basis of the tracking error signal generated by the optical section 2 as described above, the tracking system transfer function 9 generates the drive output for the precision positioning actuator 3 after phase compensation. By using this drive output as input, the precision positioning actuator 3 moves the objective lens 1 so that it may follow the signal track even if the disk D is eccentric.

Since the signal tracks on the disk D are recorded spirally from an inner circumference to an outer circumference, the objective lens 1 following the signal tracks gradually deviates to an outer circumference. The deviation appears in the drive output for the precision positioning actuator 3 as a DC offset. Therefore, only a low-frequency component of the drive output for the precision positioning actuator 3 is taken out by the low-pass filter 10. If the low-frequency component deviates from the level located at the center of movement of the precision positioning actuator 3 by a fixed value or more such as, for example, a value corresponding to 30 μm calculated in terms of deviation of the objective lens 1, the pulse generation means 12 outputs a pulse for driving the coarse positioning actuator 7. That is to say, a dead zone is provided for displacement detection of the precision positioning actuator 3. When the precision positioning actuator 3 has moved so as to exceed the dead zone, the coarse positioning actuator 7 is driven by a pulse. This pulse is predetermined so as to have a magnitude large enough to cope with the load and static frictional force of the coarse positioning actuator 7 and such a time width that the value of movement becomes smaller than the value of deviation corresponding to the above described dead zone. After the drive pulse has been outputted once, the next output is not outputted for at least the time constant of the low-pass filter in order to avoid false operation of the coarse positioning actuator 7 which would otherwise be caused by the phase lag of the low-pass filter 10. Therefore, the objective lens 1 can be positioned nearly in the range of the dead zone from the drive center of the precision positioning actuator 3. The lens position converting transfer function 11 is a transfer function for converting the displacement of the coarse positioning actuator 7 to a displacement of the objective lens 1. Eventually, the control system of this optical head feed device functions so that the error between the absolute displacement of the objective lens 1, which is determined by the displacements of the precision positioning actuator 3 and the coarse positioning actuator 7, and the signal track of the disk D may become 0.

By using the optical head feed device heretofore described, it becomes possible to make the objective lens 1 follow the signal tracks of the disk D over a wide range extending from an inner circumference to an outer circumference. Furthermore, even if there is some degree of fluctuation in static frictional force and/or load of the coarse positioning actuator 7, the position error of the precision positioning actuator 3 can be suppressed to a small value.

Figure 3:
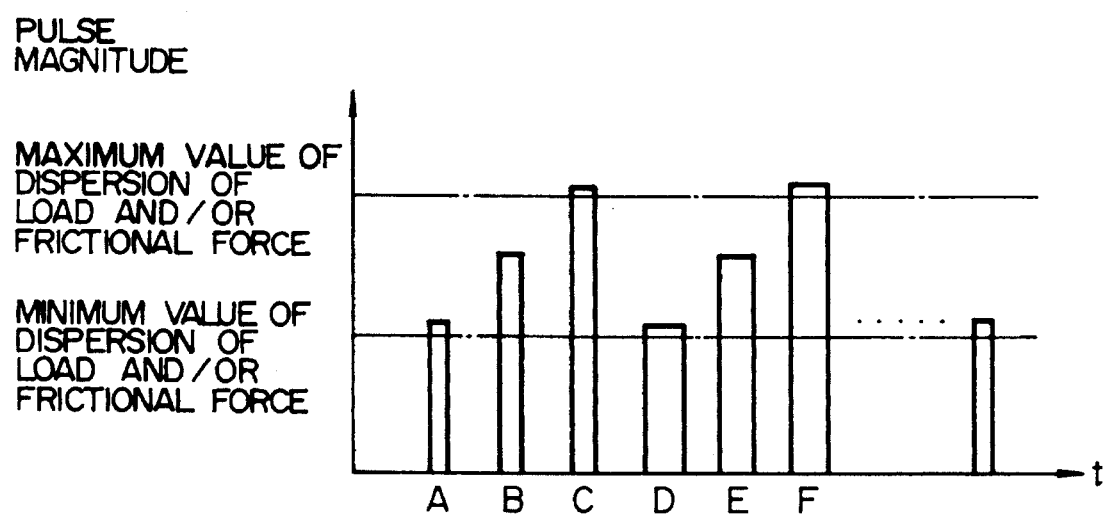
FIG. 3 is a diagram for explaining a change made in magnitude and time width of a pulse by pulse generation means used in the optical head feed device shown in FIG. 2A.
Figure 4:
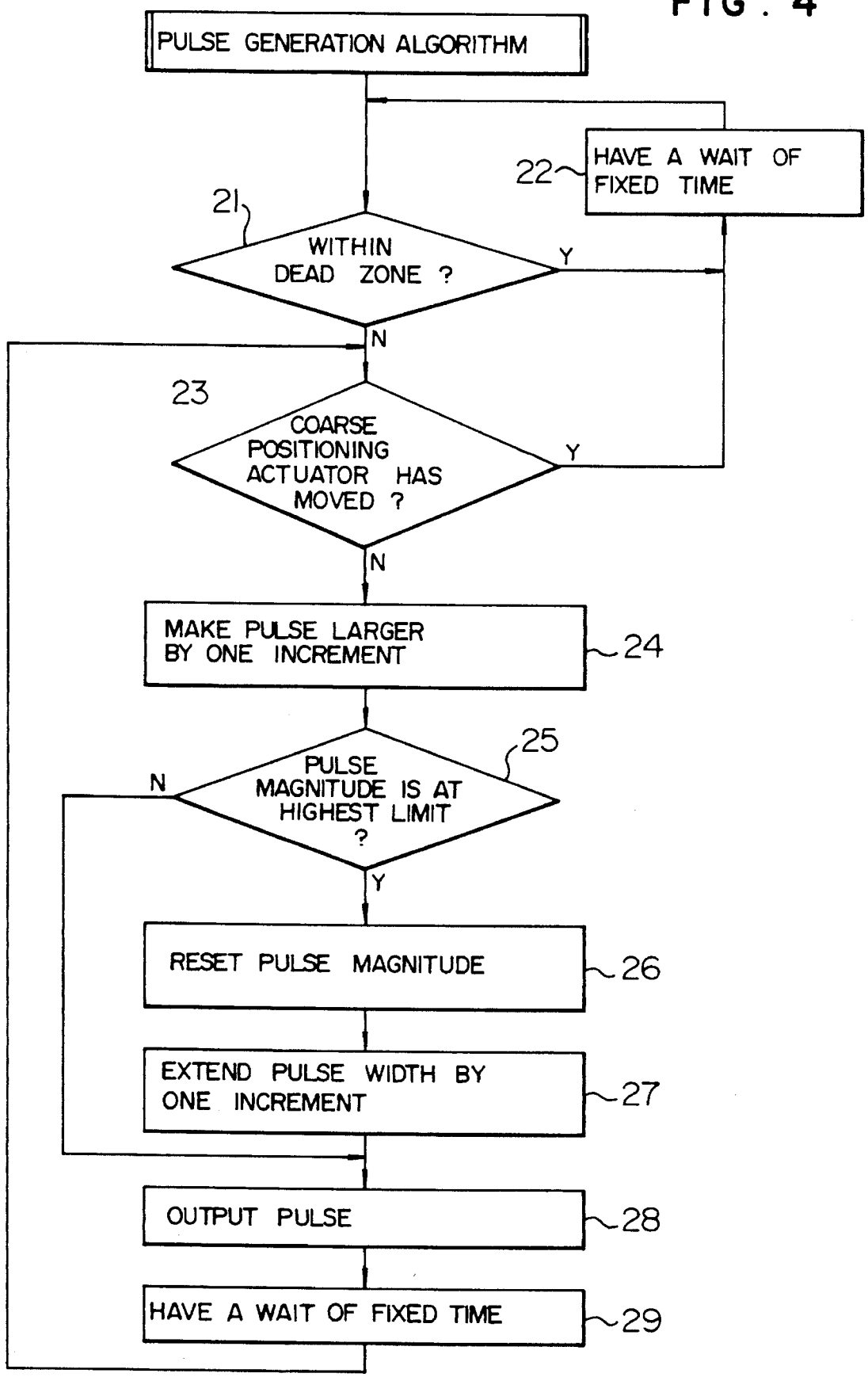
FIG. 4 is a flow chart for explaining the operation of the pulse generation means used in the optical head feed device shown in FIG. 2A.

The operation of the above described pulse generation means 12 will now be described by referring to FIG. 3, which is a graph showing how to change the magnitude and time width of pulses, and a flow chart shown in FIG. 4.

First of all, the pulse generation means 12 detects whether the low-frequency output of the drive output for the precision positioning actuator 3 has exceeded a preset dead zone or not (step 21). If it is detected that the dead zone has been exceeded, the pulse generation means 12 outputs a pulse as represented by A in FIG. 3. The pulse has a magnitude somewhat exceeding the minimum value of dispersion of fluctuation in static frictional force and/or load of the coarse positioning actuator 7. The pulse also has a time width determined so that the value of movement of the precision positioning actuator 3 may become smaller than a distance corresponding to the dead zone. Then the pulse generation means has a wait of a fixed time which is at least the time constant of the low-pass filter 10 (step 22). Thereafter, it is detected again whether the low-frequency output of the drive output for the precision positioning actuator 3 has exceeded the preset dead zone or not (step 21). When the low-frequency output value has not changed or the change value is so small that the low-frequency output value may not be within the dead zone, the pulse is increased in magnitude intermittently and outputted at intervals of the above described fixed time as represented by B to F of FIG. 3 until the maximum value of dispersion of fluctuation in static frictional force and/or load of the coarse positioning actuator 7 is exceeded. If it produces no effect, the time length is lengthened a little more, and a similar operation is repeated (steps 23 to 29).

With respect to a fluctuation in static frictional force and/or load of the coarse positioning actuator 7, the above described control makes it possible to output a drive pulse, which is best adapted to confine the precision positioning actuator 3 into the dead zone under the fluctuation state, to the coarse positioning actuator 7. Therefore, the position error of the precision positioning actuator 3 can be confined generally to the dead zone, and the optical head can be fed stably.

As heretofore described, the present invention makes it possible to reduce the displacement error of the precision positioning actuator from the center of movement by detecting the low-frequency component of displacement of the precision positioning actuator and generating the drive output for the coarse positioning actuator pulsatively at predetermined time periods so that the displacement may come within a fixed range. Therefore, the optical head can be fed stably.

If a fixed time has elapsed since a drive pulse for the coarse positioning actuator was outputted and thereafter the low-frequency component of displacement of the precision positioning actuator does not change or the change value is small, the magnitude and time width of the above described drive pulse are changed, and the drive pulse with the magnitude and time width thus changed is outputted again.

Even if there is fluctuation in static frictional force and/or load of the precision positioning actuator, such a configuration makes it possible to output a nearly optimum pulse for confining the displacement of the precision positioning actuator to a predetermined fixed range and to drive the coarse positioning actuator by the pulse.

We claim:

1. An optical head feed device comprising:

a precision positioning actuator for precisely positioning an objective lens in a tracking direction;

a coarse positioning actuator for moving said objective lens and said precision positioning actuator; and a coarse positioning actuator drive output means for detecting a low-frequency component of a relative displacement of said precision positioning actuator with respect to said coarse positioning actuator and for generating and supplying first drive pulses to said coarse positioning actuator at predetermined time periods to reduce said relative displacement to within a fixed range, said coarse positioning actuator drive output means comprising means for generating a modified drive pulse having a magnitude and a time width which are different from a magnitude and a time width of said first drive pulses and for supplying said modified drive pulse to said coarse positioning actuator when (i) a fixed time period has elapsed since the coarse positioning actuator drive output means outputted one of said first drive pulses for the coarse positioning actuator and (ii) after said fixed time period, the low-frequency component of displacement of the precision positioning actuator does not change or changes by an amount which is less than that which indicates that the low-frequency actuator is within said fixed range.

2. An optical head feed device for making an objective lens follow a signal track on an information medium, said device comprising:

a precision positioning actuator for being controllably moved to undergo controlled motion to cause a precise displacement of said objective lens to precisely position said objective lens in a tracking direction;

a coarse positioning actuator, said precision positioning actuator being mounted movably relative to said coarse positioning actuator, said coarse positioning actuator for being controllably moved so as to move said objective lens together with said precision positioning actuator;

a coarse positioning actuator drive output means for detecting a low-frequency component of a relative displacement of said precision positioning actuator with respect to said coarse positioning actuator and for generating drive pulses and supplying said drive pulses to said coarse positioning actuator at predetermined time periods to reduce said relative displacement to within a fixed range;

an optical section for optically scanning said signal track to receive light reflected from said signal track and to generate a tracking error signal in accordance with said light reflected from said signal track; and control means for receiving said tracking error signal and for generating, in accordance with said tracking error signal, a drive signal for controlling said precision positioning actuator, said drive signal being applied to said precision positioning actuator to control said precise displacement of said objective lens, and said drive signal also being supplied to said coarse positioning actuator drive output means, said coarse positioning actuator drive output means detecting said low-frequency component of said relative displacement of said precision positioning actuator with respect to said coarse positioning actuator in accordance with a low-frequency component of said drive signal.

* * * * *